COLOR TELEVISION RECEIVER KINESCOPE MASTER BIAS ARRANGEMENT
Filed June 4, 1963
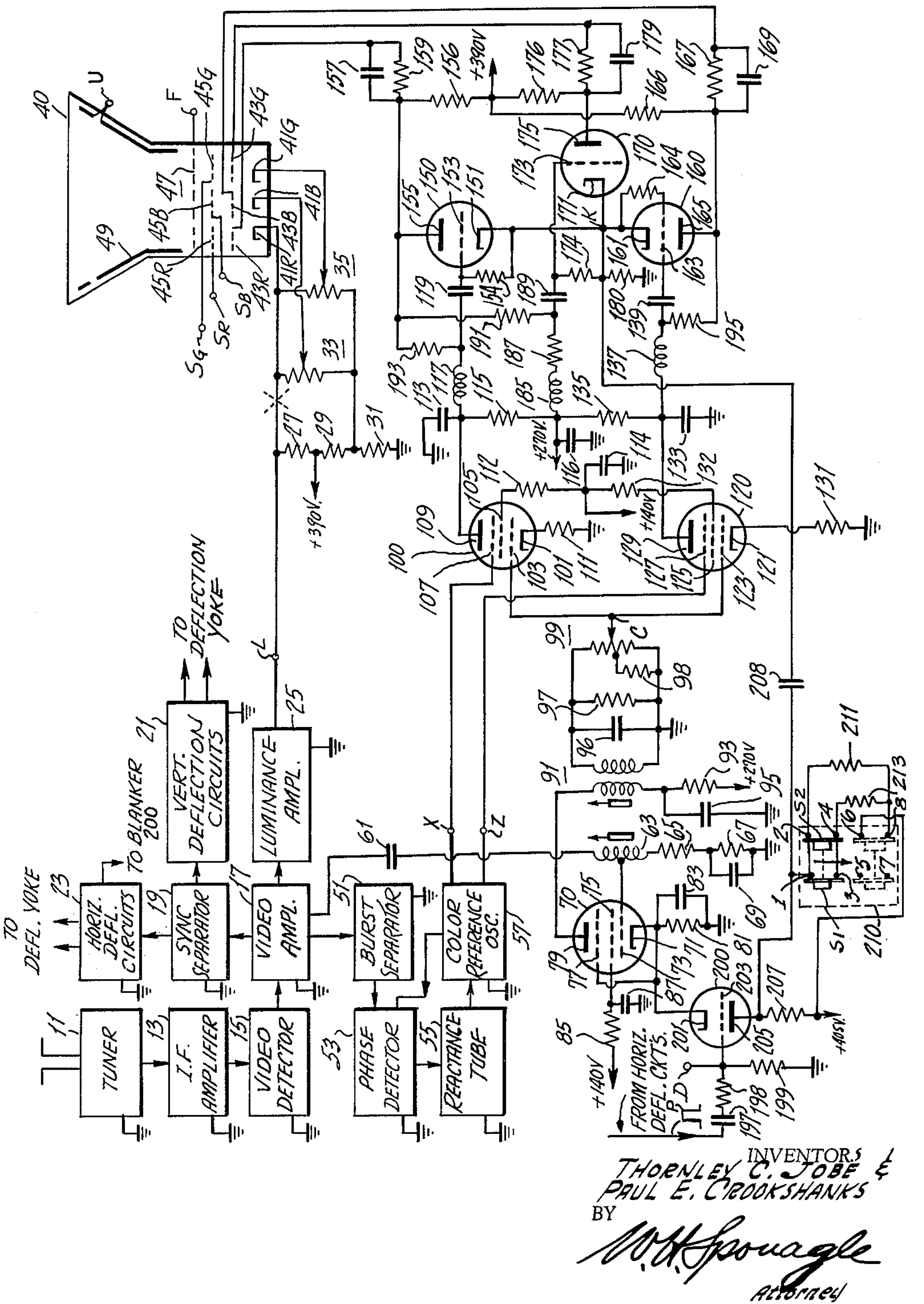
INVENTORS
THORNLEY C. JOBE &
PAUL E. CROOKSHANKS
BY
[signature]
Attorney 3,251,931
Patented May 17, 1966

3,251,931

COLOR TELEVISION RECEIVER KINESCOPE MASTER BIAS ARRANGEMENT

Thornley C. Jobe and Paul E. Crookshanks, Indianapolis, Ind., assignors to Radio Corporation of America, a corporation of Delaware Filed June 4, 1963, Ser. No. 285,380
3 Claims. (Cl. 178—5.4)

The present invention relates generally to color television receivers and, particularly to novel and improved arrangements for supplying signal components and operating biases to a color image reproducer, and to related circuitry and methods for enabling establishment of optimum signal drive and bias conditions.

A widely used form of color image reproducer is the tri-gun, shadow-mask, color kinescope. In such a color kinescope, each of a trio of electron guns in the device selectively control energization of a different one of three primary phosphor sets (red, green and blue) incorporated in the display screen of the kinescope. An efficacious design of color television receivers employes separate luminance and chrominance channels, which deliver respective signal components to respectively different electrodes of each electron gun. Conventionally, a common luminance signal is supplied to each gun cathode, while distinct color-difference signals (e.g. R-Y, G-Y and B-Y) are derived from the chrominance channel for application to the respective gun control grids. D.C. coupling is preferably employed for both luminance and color-difference signal application to the kinescope to ensure reproduction of the color image elements with proper saturation and brightness. A multi-gun color kinescope necessarily involves more complicated structure for achieving proper setting of the bias and drive conditions than is required, for example, with regard to a single gun, black and white kinescope. The RCA CTC–10 color television receiver, described in the RCA Color Television Service Data Pamphlet designated 1960 No. T5, provides an example of structure satisfying the bias and drive setting requirements of a tri-gun color kinescope. The CTC–10 color receiver employs D.C. coupling of the receiver's luminance channel to the kinescope cathodes via an arrangement which incorporates a pair of drive adjusting potentiometers allowing adjustment of the relative magnitudes of the common luminance signal drive to the respective kinescope cathodes; a trio of screen potential adjusting potentiometers permits separate and individual selection of the screen grid bias for each electron gun of the color kinescope. Additionally, a master bias adjusting potentiometer is provided in association with the control grid circuits of all three electron guns, whereby a single adjustment alters in similar fashion the bias on all three control grids.

The described set of controls, together with a switch arrangement permitting simultaneous disabling of normal luminance signal drive and disabling of the kinescope's vertical deflection apparatus, facilitates the setting of the bias and drive conditions for optimum operation of the color kinescope in accordance with relatively simple set-up procedural steps (described in detail in the aforesaid Service Data pamphlet).

When a master bias control is directly associated with the control grids of the color kinescope, as in the CTC–10 receiver, isolating circuitry must be provided to insure that adjustments of kinescope bias to not adversely effect the color-difference amplifiers supplying signals the same control grids. Such an isolation requirement introduces attenuation of at least the D.C. component of the color-difference amplifier output in its coupling to the kinescope control grid; concomitant attenuation of the accompanying A.C. component can be effectively precluded, but at the expense of increasing the possibility of D.C. instability. Avoidance of the D.C. component attenuation, whereby full D.C. coupling to the kinescope of the color-difference signals may be achieved, is effected in one feasible manner in the bias and drive arrangement of the RCA CTC-12 color television receiver, described in the RCA Color Television Service Data pamphlet designated 1962 No. T6. In the CTC-12 receiver arrangement, the master bias control for the color kinescope is associated with the kinescope cathode electrodes; however, a disadvantage of this bias control location resides in an attendant reduction of usable luminance drive range.

The present invention is directed to an improved bias and drive arrangement for a color kinescope incorporating a novel form of master bias control, such novel form permitting master bias adjustment to be achieved while permitting full D.C. coupling of color-difference signals, avoiding reduction in voltage swing available for luminance signal drive, and, further, avoiding the circuit complexity attending incorporation of the bias control in either the cathode or control grid circuits of the color kinescope. To achieve this end, the present invention relegates the bias control to circuitry isolated and remote from the kinescope electrode circuits themselves. In particular, the kinescope bias adjustment is achieved by controlling the amplitude of a pulse delivered to input electrodes of the color-difference amplifiers that drive the kinescope control grids. In accordance with a particular embodiment of the present invention, the pulse amplitude adjustment is simply effected by a switch arrangement permitting selection of different impedance values in the plate circuit of a pulse amplifier incorporated in a color television receiver.

To appreciate how regulation of the amplitude of a pulse may serve a master kinescope bias adjusting purpose, it is in order to consider the purposes and operations of a color difference amplifier pulsing procedure which is employed, for example, in both the CTC-10 and CTC-12 receivers mentioned above. These receivers follow the practice of utilizing only two color demodulators to recover, by well known synchronous detection principles, two distinct signals of color-difference form from the received chrominance signal component (a modulated color sub-carrier wave). These receivers further employ a color matrixing arrangement incorporating a trio of color difference amplifier tubes sharing a common cathode load. One demodulator output is applied to the control grid of one tube of this trio, while the other demodulator output is applied to the control grid of another of this trio; the common cathode coupling results in the production of respectively different mixtures of the two demodulator outputs at the anodes of each of the trio of amplifier tubes. By proper selection of such parameter values as the effective angles of demodulation and the impedance level of the common cathode load, the set of signals appearing at the color difference amplifier anodes may be caused to correspond to the desired R-Y, G-Y and B-Y signals.

An additional "signal" application is made to the trio of amplifiers, viz. the application of a horizontal blanking pulse to the common cathode terminal. This blanking pulse coincides in time with the horizontal retrace interval of the kinescope scanning operation, is of a conduction-enhancing polarity, and is of sufficient amplitude to cause the flow of grid current in each amplifier tube during the horizontal retrace interval. The flow of grid current causes development of a charge on a capacitor associated with the control grid of each amplifier tube which effectively establishes the operating point of the associated amplifier tube. In the full D.C. coupling arrangement of the CTC–12 receiver, this setting of the color difference amplifier tube operating point, in turn, serves to effectively set the bias on the associated kinescope control grid. Applicants have recognized that, with a full D.C. coupling arrangement such as that of the CTC—12, adjustment of the amplitude of the applied blanking pulse will achieve, via amplifier tube operating point setting, adjustment of kinescope control grid bias, and that since the applied blanking pulse affects all three color difference amplifier tubes in common, the pulse amplitude adjusting apparatus may truly serve as a master kinescope bias control.

A primary object of the present invention is to provide novel and improved bias and drive arrangements for a color image reproducer, such bias and drive arrangements permitting optimization of the reproducer operating conditions with controls of a form minimizing circuit complexity and avoiding introduction of signal attenuation. Other objects and advantages of the present invention will be readily apparent to those skilled in the art upon a reading of the following detailed description and an inspection of the accompanying drawing in which a color television receiver is illustrated in a diagram, partially block and partially schematic, the illustrated receiver incorporating a kinescope bias and drive arrangement embodying the principles of the present invention.

The color television receiver of the drawing incorporates the conventional elements of tuner, IF amplifier and video detector; the tuner 11 converts a received broadcast television signal to intermediate frequencies falling in the passband of IF amplifier 13, to which the output of tuner 11 is applied. The amplified intermediate frequency output of the IF amplifier 13 is conveyed to a video detector 15, which recovers a composite color video signal. The composite video signal output of detector 15 is supplied to a video amplifier 17, having a plurality of outputs which are used in various channels of the color television receiver.

One of the outputs of the video amplifier 17 is supplied to a sync separator 19, which serves in the conventional manner to separate the deflection synchronizing components from the remainder of the composite video signal. The separated synchronizing wave output of the sync separator 19 is applied to both vertical and horizontal deflection circuits, 21 and 23, respectively. The respective deflection circuits develop suitably synchronized scanning waves for application to the appropriate windings of a deflection yoke (not illustrated), which effects beam deflection in the receiver's color image reproducing device so as to develop a scanning raster on the viewing surface of the reproducing device; the reproducing device of the illustrated receiver is a tri-gun, shadow mask, color kinescope 40.

The color kinescope 40 includes a plurality of operating electrodes: a trio of electron-emissive cathodes 41R, 41B and 41G; a trio of control grids 43R, 43B and 43G; a trio of screen grid electrodes 45R, 45B and 45G; a commonly energized focussing electrode structure 47; and a final accelerating of ultor electrode 49. Energization of the ultor electrode 49, the focussing electrode structure 47 and the individual screen grids 45R, 45B and 45G, is accomplished using suitable D.C. voltage sources (not shown); these sources may be, for example, as shown in the previously discussed Service Data pamphlets for the CTC–10 or CTC–12 color television receivers, whereby the ultor supply terminal U (to which ultor electrode 49 is directly connected) will receive a suitably regulated high voltage (e.g. 24 kv.), the focussing electrode structure 47 will receive at its supply terminal F an adjustable D.C. potential of intermediate level (e.g. from 4300 to 5150 volts), and each of the screen grid electrodes 45R, 45B and 45G will receive at their individual supply terminals $S_R$, $S_B$ and $S_G$ an individually adjustable D.C. potential of a level in the vicinity of the receiver's B-boost voltage level (e.g. in the vinicity of 850 volts).

The electrodes 41R, 43R and 45R, in cooperation with portions of the focussing electrode structure 47 form a "red" electron gun which produces a beam that serves to selectively energize red light emitting phosphors on the kinescope's screen structure (not illustrated). Electrodes 41B, 43B and 45B similarly are associated in forming a "blue" electron gun, and electrodes 41G, 43G and 45G are similarly associated in forming a "green" electron gun.

Each of the cathodes 41R, 41B and 41G receive luminance signal information from a common source, which comprises a luminance amplifier 25 responding to an output of video amplifier 17. The luminance amplifier 25 is provided with an output terminal L, connected to a source of positive energizing potential for the amplifier via a luminance amplifier load resistor 27; terminal L is directly connected to the red gun cathode 41R. A voltage divider, comprising resistors 29 and 31 in series, is connected between the positive operating potential source and chassis ground. Luminance signal application to the blue gun cathode 41B and to the green gun cathode 41G is effected via a pair of potentiometers 33 and 35, respectively. One end terminal of each of the potentiometers 33 and 35 is directly connected to the terminal L, while the other end terminal of each of the potentiometers is directly connected to the junction of voltage divider resistors 29 and 31. The blue gun cathode 41B is connected to the adjustable tap of potentiometer 33, while the green gun 41G is connected to the adjustable tap of potentiometer 35. Adjustment of the position of these taps permits selection of the relative degree of luminance drive to the trio of electron guns of kinescope 40.

A burst separator 51, keyed by suitable gating pulses (derived, for example from the horizontal deflection circuits 23), responds to an output of video amplifier 17 to develop a separated color synchronizing component, comprising recurring bursts of color subcarrier frequency waves of reference phase. The burst separator output is utilized to synchronize a color reference oscillator 57 in frequency and phase. One form of structure suitable for effecting such synchronization is illustrated in the drawing, and comprises a phase detector 53, comparing in phase outputs of both separator 51 and oscillator 57 to produce a D.C. control voltage representative of departures of the oscillator from proper phase synchronization. The control voltage output of phase detector 53 is applied to a reactance tube 55, in turn coupled to frequency determining circuitry of the oscillator 57, the reactance tube 55 responding to the applied control voltage variations to produce correcting changes in the operation of oscillator 57.

The color reference oscillator 57 is provided with output terminals X and Z, at which appear respectively different phases of the locally generated color reference oscillations. The X and Z phases of the oscillator output are employed in the operation of synchronously detecting the modulated color subcarrier wave which constitutes the received chrominance signal. Amplification of the chrominance signal prior to detection is accomplished in a bandpass amplifier utilizing pentode 70 as an amplifying device. The signals applied to the chrominance amplifier tube 70 are derived from the video amplifier 17.

A coupling capacitor 61 delivers signals from an output of video amplifier 17 to a resonant input circuit of the chrominance amplifier, the resonant input circuit comprising a tunable coil 63. The coupling capacitor 61 is coupled to one end terminal of coil 63; the other end terminal of coil 63 is returned to chassis ground via a resistor 65 in series with a parallel RC network, comprising resistor 67 shunted by capacitor 69. The control grid 73 of pentode 70 is directly connected to an intermediate tap on coil 63.

Additional electrodes of pentode 70 comprises a cathode 71, returned to chassis ground via a cathode resistor 81 shunted by capacitor 83; a screen grid 75, bypassed to ground for chrominance signal frequencies by capacitor 87 and linked to a source of positive operating potential by a dropping resistor 85; a suppressor grid 77, internally connected to cathode 73; and an anode 79, coupled to a source of positive anode potential via the tunable primary winding of a chrominance output transformer 91 in series with a dropping resistor 93, the junction between primary winding and resistor 93 being bypassed to ground via capacitor 95.

The input coil 63 and the transformer 91 winding are tuned in the vicinity of the nominal color subcarrier frequency in order to provide the chrominance amplifier with a bandpass characteristic centered about such frequency value and encompassing desired sideband frequencies associated with the color subcarrier. The secondary winding of chrominance output transformer 91 is shunted by a capacitor 96, having a value appropriate to the desired bandpass tuning; the secondary winding is additionally shunted by a damping resistor 97, and is also shunted by the resistive element of a chrominance signal amplitude adjusting potentiometer 99. A portion of the potentiometer resistive element is shunted by a range adjusting resistor 98. One end terminal of each of the transformer secondary shunting elements is directly connected to chassis ground. The potentiometer 99 is provided with movable tap, whereby a selectable magnitude of chrominance signal information may be supplied to the chrominance input terminal C of the color receiver's synchronous detectors, the terminal C being directly connected to the tap of potentiometer 99.

A pair of pentodes 100 and 120 serve as color demodulator tubes for effecting the synchronous detection of the received modulated color subcarrier waves. The respective cathodes, 101 and 121, of tubes 100 and 120 are returned to chassis ground by respective unbypassed cathode resistors, 111 and 131. The respective control grids, 103 and 123, of tubes 100 and 120 are each directly connected to the chrominance input terminal C. A common positive operating potential supply point, bypassed to ground by capacitor 114, is linked to screen grid 105 of tube 100 by a screen dropping resistor 112, and is linked to the screen grid 125 of tube 120 by a similarly valued screen dropping resistor 132. The third grid 107 of demodulator tube 100 is directly connected to output terminal X of color reference oscillator 57, while the third grid 127 of demodulator tube 120 is directly connected to the output terminal Z of oscillator 57. The respective plates, 109 and 129, of tubes 100 and 120 are connected to a common supply point of positive plate potential (suitably bypassed to ground by capacitor 116) via respective load resistors 115 and 135 of matched impedance value.

The plate outputs of demodulator tubes 100 and 120, which respectively comprise X and Z color-difference signals, are supplied to a color matrix circuit employing a trio of triodes, 150, 160 and 170; the color matrix circuit serves to suitably mix the X and Z color-difference signals in order to obtain a trio of output signals taking the form of R-Y, B-Y and G-Y color-difference signals. The respective cathodes 151, 161 and 171 of triodes 150, 160 and 170, are each directly connected to a common cathode terminal K, and returned therefrom to ground via a common cathode resistor 180.

The control grid 153 of tube 150 is coupled to receive the X signal output of demodulator tube 100, while the control grid 163 of matrix tube 160 is coupled to receive the Z signal output of demodulator tube 120. The X signal coupling from demodulator tube plate 109 to matrix tube control grid 153 is effected by means of a choke 117 in series with a coupling capacitor 119. Choke 117, aided by a shunt capacitor 113 coupled between the plate 109 and ground, effectively suppresses the frequencies of the signal inputs to demodulator 100, leaving only the difference frequency product of the synchronous detection operation for delivery to control grid 153. A comparable mode of Z signal coupling from demodulator tube plate 129 to matrix tube control grid 163 is carried out, using choke 137 in series with coupling capacitor 139; input signal frequency suppression is achieved employing choke 137 and a capacitor 133 (coupled between plate 129 and ground). Resistors 154 and 164 serve as grid leak resistors for the respective triodes 150 and 160, each being directly connected between the respectively associated cathode and control grid electrodes.

The control grid 173 of triodes 170 is coupled to the point of positive plate potential supply for the demodulator tubes by the series combination of a capacitor 189, a resistor 187 and a choke 185. Capacitor 189 matches the capacitance value of the respective coupling capacitors 119 and 139, and choke 185 matches the inductance value of chokes 117 and 137. Resistor 187 effectively matches the resistance value of one of the matched demodulator load resistors 115, 135, as modified by the shunting effect of its respectively associated demodulator tube. A resistor 174, of equal resistance value to resistors 154 and 164, links cathode 171 to control grid 173 to thus serve as the grid leak resistor for tube 170. In view of the foregoing grid circuit connections and relationships, the impedance effectively presented to control grid 173 of triode 170 is equal, in all significant aspects, to the impedance effectively presented to each of the respective control grids 153 and 163.

Each of the anodes 155, 165 and 175 of the matrix tubes 150, 160 and 170 is connected to a common anode potential supply point by means of a respective anode load resistor (156, 166, 176), the three anode load resistors being of equal resistance value. A direct current conductive connection is provided between each of the anodes 155, 165 and 175 and the respective appropriate kinescope control grid (43G, 43B and 43R) in such manner as to deliver to the latter the color-difference signal output of each matrix tube without attenuation of its D.C. component relative to its A.C. component. For kinescope projection purposes, a limiting resistor (shunted by a capacitor) is included in series in each coupling path from matrix tube anode to kinescope grid; resistor 159 (shunted by capacitor 157) serves this function in the path to the red control grid 43R, while resistor 177 (shunted by capacitor 179) and resistor 167 (shunted by capacitor 169) serve similar purposes for the green and blue control grids, 43B and 43G, respectively. Should a matrix tube fail, the drawing of substantial grid current by the associated electron gun is avoided due to the presence of the protective circuit elements; in normal operation, the protective circuit elements have substantially no effect on the color-difference signal drive of the kinescope control grids, allowing effectively 100% D.C. coupling from each matrix tube to the kinescope.

The general theory and principles of operation of the three-tube, common cathode matrix circuit described above are set forth in U.S. Patent 2,830,112, issued to Dalton H. Pritchard on April 8, 1958. Modification of this general theory of operation in certain aspects is provided in the circuit of the drawing by the use of resistors 191, 193 and 195.

Resistor 191 is connected between the anode 155 of matrix tube 150 and the junction between resistor 187 and coupling capacitor 189 in the grid circuit of matrix tube 170. Resistor 191 provides a cross-coupling of the portion of the R–Y output of tube 150 to the control grid 173 of the tube 170 (from which a G–Y signal is to be derived). The use of this cross coupling of R–Y signal information enables the obtaining of a more accurate G–Y representation in the tube 170 output where practical design conditions restrict the range of selection of such circuit parameters as the X and Z demodulating angles and the common cathode impedance value.

Resistor 193 is connected between the anode 155 of matrix tube 150 and the junction between choke 117 and coupling capacitor 119 in the grid circuit of tube 150. Similarly, resistor 195 is connected between the anode 165 of tube 160 and the junction between choke 137 and coupling resistor 139 in the grid circuit of tube 160. The resistors 193 and 195 thus provide respective negative feedback paths for the matrix tubes 150 and 160. The use of such negative feedback affects a desired adjustment of the associated matrix tube gain, as well as overcoming a bandwidth reduction effect that tends to flow from the use of the 100% D.C. coupling circuit arrangement previously discussed. That is, with the use of 100% D.C. coupling from matrix tube to kinescope control grid, the matrix tube load resistor plays a major role in determining the level of bias on the associated kinescope control grid; in practice, satisfaction of the kinescope bias demands may thereupon call for the use of an unusually large matrix tube load resistor, with resultant adverse effect on matrix tube output bandwith unless compensation is provided, as by the above-noted use of negative feedback.

The conjoint use of the three resistors 191, 193 and 195 additionally serves a meaningful purpose with regard to the maintaining of substantially matched and stable D.C. biases on kinescope control grids. This effect will be more readily appreciated after an explanation of the role played by the blanker triode 200 (not heretofore described) in setting and controlling the kinescope control grid biases, a role that is exploited to distinct advantage in the present circuit.

The control grid 203 of the blanker triode 200 is arranged to receive a train of positive going pulses P derived from the horizontal deflection circuits 23. The pulses P, which may comprise, for example, flyback pulses derived from the horizontal output transformer employed in the deflection circuit 23, coincide in time with the successive horizontal retrace intervals of the received composite signal. The pulses P are applied to control grid 203 via a coupling capacitor 197 in series with a resistor 198. A resistor 199 is connected between control grid 203 and chassis ground. Grid current conduction in triode 200 in response to the application of the positive-going pulses P to control grid 203 develops a charge on capacitor 197 which holds the triode 200 cut off during the video intervals between the appearance of successive pulses P. The negative D.C. voltage thus developed at grid 203 is available at grid terminal D for biasing use elsewhere in the receiver.

The cathode 201 of blanker triode 200 is directly connected to the cathode 71 of the chrominance amplifier tube 70. Resistor 81 accordingly is shared as a common cathode resistor by both the chrominance amplifier tube 70 and the blanker triode 200. Due to the use of the bypass capacitor 83 in shunt with the common cathode resistor 81, the chrominance signal frequencies have substantially no effect on the blanker triode 200. However, the pulses P applied to the triode control grid 203 do appear, without phase inversion, across the common cathode resistor 81. The effect of this appearance is to drive the chrominance amplifier cathode 71 sufficiently positive so as to cut off the chrominance amplifier tube 70 during the pulse occurrence. Due to this cut-off action, the synchronizing burst component in the signal delivered to the chrominance amplifier grid is not repeated in the chrominance amplifier output; rather, the output during each successive horizontal retrace interval is devoid of signal information, and is instead a substantially constant level throughout the retrace interval.

The elimination of the burst component from the chrominance signal input to the succeeding demodulator stages 100 and 120 is highly desirable from several points of view. Appearance of a "demodulated burst" in the demodulator output may lead to the appearance and coloring of retrace lines on the kinescope display screen; additionally, appearance of the demodulated burst in the demodulator outputs may disturb D.C. restoring or establishing operations in subsequent color-difference signal processing and amplifying stages.

The plate 205 of the blanker triode 200 is connected to a source of positive operating potential by means of a plate resistor 207. The plate 205 is also connected by means of a large coupling capacitor 208 to the common cathode terminal K of the previously discussed three-tube matrix circuit. The effect of this latter connection is to supply to the cathodes of each of the matrix tubes 150, 160 and 170 a phase inverted (hence, negative-going) version of the positive-going pulses P. The pulses delivered to terminal K are of sufficient magnitude to drive the grid-cathode diodes of each of the matrix tubes into grid current conduction during each horizontal retrace interval. This periodic conduction develops a charge on the respective grid capacitors 119, 139 and 189 which sets the operating points of the respective matrix tubes. The principles of this mode of operating point setting, and the inherent stability advantages thereof, are set forth in Patent No. 2,901,534 issued to Charles B. Oakley on August 25, 1959.

The setting of the operating point of each matrix tube in the above-described manner will be readily recognized as having the effect of establishing the no-signal plate voltage value for each matrix tube. In view of the 100% D.C. coupling arrangement employed in driving the kinescope control grids, it accordingly follows that the setting of the matrix tube operating points directly affects the D.C. bias on each kinescope control grid.

The above-described relationship between blanker triode 200 operation and setting of kinescope grid biases is utilized to provide a highly advantageous arrangement for adjusting the kinescope grid biases. To effect this adjustment in the embodiment illustrated in the drawing, there is associated with the previously mentioned blanker triode plate resistor 207 certain additional elements comprising a three-position switch 210 and auxiliary plate resistors 211 and 213.

The switch 210 is illustratively of a type employing eight fixed contacts and a pair of ganged, slidable shorting bars S1 and S2. In a "first" position of the switch (i.e., that illustrated by a solid line showing of bars S1 and S2 in the drawing) shorting bar S1 links fixed contact 1 to fixed contact 3, while shorting bar S2 links fixed contact 2 to fixed contact 4. In a "second" switch position, shorting bar S1 will link fixed contact 3 to fixed contact 5, while shorting bar S2 will link fixed contact 4 to fixed contact 6. In a "third" switch position (i.e., that illustrated by a dotted line showing of bars S1 and S2 in the drawing), shorting bar S1 will link fixed contact 5 to fixed contact 7, while shorting bar S2 will link fixed contact 6 to fixed contact 8. The permanent connections to the fixed contacts of switch 210 are the following: Fixed contact 1 is directly connected to the plate 205 of blanker triode 200, and is additionally directly connected to fixed contact 2; fixed contact 4 is directly connected to fixed contact 3, and is additionally connected by means of auxiliary load resistor 213 to fixed contact 8; fixed contact 6 is directly connected to the operating potential supply terminal of load resistor 207; and fixed contact 8 is connected by means of auxiliary load resistor 211 to fixed contact 2.

As a result of the above-described connections, adjustment of switch 210 between its three switch positions produces the following circuit changes: In the "first" described switch position, auxiliary plate resistors 211 and 213 are effectively out of circuit, and plate resistor 207 provides the sole direct current path between the B+ supply point and the plate 205 of blanker triode 200. In the "second" described switch position, the series combination of auxiliary plate resistors 211 and 213 is shunted across plate resistor 207. In the "third" described switch position, only auxiliary plate resistor 211 is shunted across the load resistor 207.

The effect of altering switch 210 between its "first," "second" and "third" described positions is to alter the amplitude of the voltage pulse delivered to the common cathode terminal K. To appreciate the manner in which this result is effected, a more detailed explanation of the development of pulses at terminal K is in order.

The operation of blanker tube 200 may be likened in some respects to the familiar discharge tube circuit, often employed for deflection waveform generation purposes. Capacitor 208, of relatively large capacitance value, is associated with a charging circuit during the video intervals between retrace pulses. Blanker triode 200 is cut off during these video intervals due to self-biasing action in its grid circuit. The capacitor 208 is charged from the receiver's B+ supply through a path which comprises plate resistor 207 (together with any resistance that adjustment of switch 210 may place in shunt with resistor 207). The common cathode resistor 180 of the matrix circuit is also in the charging current path; however, the value of resistor 180 will be sufficiently low relative to the value of resistors 207, 211 and 213 as to have little effect in determining the time constant of the charging circuit.

The selective shunting of plate resistor 207 with auxiliary plate resistor 211, or with the series combination of auxiliary plate resistors 211 and 213, significantly affects the time constant of the charging circuit. Since the charging time period is fixed, the direct effect of the switch 210 adjustment is to significantly vary the magnitude of the charge developed on capacitor 208 between retrace pulse occurrences.

When a positive-going retrace pulse P is applied to the grid 203 of the blanker triode 200, the triode 200 is rendered conductive, and a relatively low impedance discharge path (comprising the conducting triode 200, and the relatively low impedance cathode resistor 81 of the chrominance amplifier 70, as well as the low impedance common cathode resistor 180) is presented to the charged capacitor 208. A substantially complete discharge of the capacitor 208 thus occurs during the application of the pulse P to the grid 203. The magnitude of the discharge current flowing through resistor 180 is substantial, resulting in the development of a negative-going voltage pulse at terminal K of appreciable size. Since substantially complete discharge of the capacitor 208 takes place, however, the magnitude of the pulse developed at terminal 10 will be directly related to the amount of charge that is permitted to be developed on capacitor 208 during the video intervals between each succeeding retrace pulse P occurrence.

In view of the foregoing principles of operation, it will be readily recognized that the "first" switch position (in which only resistor 207 is in circuit between the B+ supply point and the blanker triode plate 205) results in the largest time constant of the capacitor 208 charging circuit, whereby the magnitude of the charge developed during video intervals is at a minimum, and hence the voltage pulse developed at terminal K is of minimum amplitude. In the "third" switch position (in which resistor 207 appears shunted by resistor 211 between the B+ supply point and the blanker triode plate 205) a minimum time constant for the capacitor 208 charging circuit is provided, resulting in maximum charge of the capacitor and hence maximum pulse amplitude at terminal K. The "second" switch position (placing the series combination of resistors 211 and 213 in shunt with resistor 207) provides an intermediate value of charging time constant and, accordingly, an intermediate level of pulse voltage at terminal K.

Switch adjustment of the amplitude of the voltage pulse developed at the common cathode terminal K in turn alters the degree of periodic grid current conduction in the three matrix tubes, thereby altering the charge developed across the respective grid capacitors 119, 139 and 189. This changes the operating points of the respective matrix tubes, altering their no-signal plate potential which, as discussed previously, determines the kinescope control grid biases. The minimum pulse amplitude, available with switch 210 in its "first" position, results in minimum matrix grid capacitor charge, and hence, minimum negative bias on the matrix tubes; accordingly, the no-signal plate potentials for the matrix tubes are least positive, whereby the kinescope grid biases are "maximum" (i.e., in the current inhibiting sense). Successive increases in pulse amplitude obtainable by moving switch 210 to its "second" and "third" positions permit alteration of the kinescope grid biases to respective "intermediate" and "minimum" levels.

It is contemplated that bias adjustments employing switch 210 of the drawing will be effected in conjunction with a kinescope set-up apparatus and procedures of the general type described in the aforementioned Service Data pamphlet designated 1960 No. T5. In such a set-up arrangement, the cut-off points of the respective guns of the color kinescope 40 are matched via individual adjustments of the biases supplied to the respective screen grid terminals $S_G$, $S_R$ and $S_B$, under test conditions of disrupted luminance signal drive of kinescope cathodes, and disabled vertical deflection (whereby the raster traced by the kinescope beams is collapsed into a single horizontal line). Placing of the color receiver in such a test condition may be achieved, as in the CTC–10 receiver, through the use of a suitably connected switch (not shown) which will simultaneously disable the generator of vertical deflection waveforms, and open the signal path from the luminance amplifier output terminal L to the kinescope cathodes (e.g. at the point designated by the dotted line X in the drawing).

When the luminance signal path is opened at the designated point, the three cathodes 41R, 41B and 41G will no longer receive normal luminance signal drive, but will each be at a common bias level determined by the voltage division of a D.C. supply potential, as effected by a divider comprising resistors 29 and 31. The relative values of resistors 29 and 31 are chosen so that the common cathode bias (established at the junction of resistors 29 and 31) under test conditions is the same as the voltage at this point with the switch closed and enough plate current in the output stage of luminance amplifier 25 to assure that this amplifying stage is operating in a linear region of its tube characteristic. Since this voltage is one extreme of the usable luminance drive to the kinescope, it is set as close to the voltage corresponding to the cut-off point of the luminance output amplifying stage as is consistent with operation over the linear portion of the output stage tube characteristic. The other extreme of the luminance drive is determined by how far this voltage can be pulled down toward ground by the luminance output tube plate current. This extreme is, therefore, limited by the maximum luminance output tube plate current.

In a preferred set-up procedure, matching of the gun cut-off points (via screen grid bias adjustments) should first be attempted with maximum grid-to-cathode bias (i.e. maximum in the current-inhibiting sense; that is, grids most negative with respect to cathodes); this corresponds to the "first" position of switch 210. If cut-off matching cannot be achieved at this level of grid bias, the switch 210 should be altered to its "second" switch position, and the gun cut-off matching procedure employing screen grid bias adjustments should again be attempted. If suitable matching can still not be achieved at this intermediate grid bias level, the switch 210 is placed in its "third" switch position, and the screen grid bias adjusting procedure is repeated under the resultant "minimum" grid bias level conditions.

The specific switch arrangement illustrated in the drawing is a preferred one of a variety of ways in which the pulse output of the blanker tube 200 may be varied for kinescope grid bias control purposes. For example, as an alternative to the switching of parallel resistance with respect to the plate resistor 207, a switch arrangement may be provided to switch series resistance. Another contemplated arrangement would employ a switch to select, for each adjustment position, a different one of a plurality of resistors as the sole direct current path from B+ to the blanker-triode plate 205. However, the illustrated switch arrangement is believed to be the most economical and practical. If continuous adjustment of pulse amplitude is desired, rather than step adjustment thereof, the switch arrangement may be replaced by a continuously variable resistor in series with, or in parallel with, plate resistor 207.

Set forth in the table below are a set of values for the various parameters of the illustrated circuit, which set has been found to provide satisfactory operation. It will be appreciated that these values are given by way of example, and that other values may be substituted therefor without departing from the principles of the present invention.

| | | |
|---|---|---|
| Inductors **117, 137, 185** | microhenries | 620 |
| Tube **40** | | 21FJP22 |
| Tube **70** | | ½ 6GH8A |
| Tubes **150, 160, 170, 200** | | ½ 6GU7 |
| Tubes **100, 120** | | 6GY6 |
| Capacitor **61** | micromicrofarads | 7 |
| Capacitors **69, 114** | microfarads | .047 |
| Capacitors **87, 116, 119, 139, 157, 169, 179, 189** | do | .01 |
| Capacitor **95** | micromicrofarads | 1000 |
| Capacitor **96** | do | 330 |
| Capacitors **113, 133** | do | 33 |
| Capacitor **197** | do | 150 |
| Capacitor **208** | microfarads | .22 |
| Capacitor **83** | micromicrofarads | 820 |
| Resistor **27** | ohms | 5600 |
| Resistor **29** | do | 6800 |
| Resistors **31, 211** | do | 39,000 |
| Resistors **65, 180** | do | 270 |
| Resistor **67** | do | 220,000 |
| Resistors **81, 98** | do | 390 |
| Resistor **85** | do | 1000 |
| Resistor **93** | do | 1500 |
| Resistor **97** | do | 560 |
| Resistor **111** | do | 150 |
| Resistors **112, 132** | do | 56 |
| Resistors **115, 135** | do | 3900 |
| Resistor **131** | do | 100 |
| Resistors **154, 164, 174** | megohm | 1 |
| Resistors **156, 166, 176** | ohms | 27,000 |
| Resistors **159, 167, 177** | do | 100,000 |
| Resistor **187** | do | 3300 |
| Resistors **191, 193, 195** | do | 270,000 |
| Resistors **198, 213** | do | 68,000 |
| Resistor **199** | do | 390,000 |
| Resistor **207** | do | 47,000 |
| Potentiometers **33, 35** | do | 6000 |
| Potentiometer **99** | do | 750 |

What is claimed is:

1. In a color television receiver including: a color image reproducing device having a set of input electrodes; means for applying respectively different color information signals to each input electrode of said set, said applying means including a plurality of signal translating devices having individual output electrodes direct current conductively connected to respectively different ones of said set of reproducing device input electrodes; respective input circuits for said plurality of signal translating devices including respective bias establishing means responsive to input circuit current; and an impedance common to all of said signal translating device input circuits;

reproducing device bias adjusting apparatus comprising, in combination:

periodic pulse generating apparatus;

means coupled between said pulse generating apparatus and said common impedance for periodically developing across said common impedance a voltage pulse of a polarity tending to induce the flow of current in each of the respective input circuits and of sufficient amplitude to fall within a range of amplitudes assuring the flow of current in each of the respective input circuits during its occurrence;

and means coupled to said last-named means for selectively altering the operation of said last-named means to selectively adjust the amplitude of said voltage pulse within said range of amplitudes;

and wherein said means for developing a voltage pulse across said common impedance comprises:

a capacitor;

means for establishing a circuit for charging said capacitor, said charging circuit including said common impedance;

an electron discharge device having cathode, control grid and anode electrodes;

an input circuit coupled to the cathode and control grid electrodes of said electron discharge device;

means for applying pulses from said generating apparatus to said device input circuit in such a manner as to render said electron discharge device conducting during each pulse occurrence and to bias said electron discharge device into a nonconducting state during the intervals between successive pulse currents;

and means including a coupling between said discharge device anode and said capacitor for establishing a discharging circuit for said capacitor, said capacitor discharging circuit including the cathode-anode discharge path of said discharge device as well as said common impedance, said capacitor discharging circuit being effectively disabled when said discharge device is biased to a nonconducting state and periodically enabled when said discharge device is rendered conductive, the amplitude and direction of current flowing through said common impedance when said discharging circuit is enabled being such as to promote the flow of grid current in each of said plurality of electron tubes;

and wherein said operation altering means comprises variable impedance means, included in at least one of said capacitor charging and discharging circuits, for selectively varying the ratio of the respective time constants of said capacitor charging and discharging circuits.

2. In a color television receiver including: a multigun color image reproducing tube, each of the guns of said reproducing tube including an input electrode; means for applying respectively different color information signals to the respective input electrodes of said reproducing tube, said applying means including a plurality of electron tubes having individual anodes direct current conductively connected to respectively different ones of said input electrodes, having individual control grids associated with respective grid bias establishing means responsive to the flow of grid current in the respective electron tube, and having individual cathodes sharing a common cathode impedance;

reproducing device bias adjusting apparatus comprising, in combination:

a source of flyback pulses;

a capacitor;

impedance means;

said capacitor, said impedance means and said common cathode impedance being serially connected to form a series combination;

means for applying a unidirectional potential across said series combination so as to establish a circuit for charging said capacitor;

an electron discharge device having cathode, control grid and anode electrodes;

an input circuit coupled to the cathode and control grid electrodes of said electron discharge device;

means for applying flyback pulses from said source to said input circuit in such a manner as to render said electron discharge device periodically conducting during each flyback pulse occurrence and to bias said electron discharge device into a nonconducting state during the intervals between successive flyback pulse occurrences;

means including a coupling between said discharge device anode and said capacitor for establishing a discharging circuit for said capacitor, said capacitor discharging circuit including the series combination of said common cathode impedance, said capacitor and the cathode-anode discharge path of said discharge device, said capacitor discharging circuit being effectively disabled when said discharge device is biased to a non-conducting state and periodically enabled when said discharge device is rendered conducting, the time constant of said capacitor discharging circuit when enabled being of a first magnitude, and the amplitude and direction of current flowing through said common cathode impedance when said discharging circuit is enabled being such as to promote the flow of grid current in each of said plurality of electron tubes;

said impedance means comprising means for selectively varying the impedance presented thereby in said capacitor charging circuit so as to vary the time constant of said capacitor charging circuit within a range of magnitudes appreciably larger than said first magnitude.

3. In a color television receiver including: a multigun color image reproducing tube, each of the guns of said reproducing tube including an input electrode; means for applying respectively different color information signals to the respective input electrodes of said reproducing tube, said applying means including a plurality of electron tubes having individual anodes direct current conductively connected to respectively different ones of said input electrodes, having individual control grids associated with respective grid bias establishing means responsive to the flow of grid current in the respective electron tube, and having individual cathodes sharing a common cathode impedance;

reproducing device bias adjusting apparatus comprising, in combination:

a source of flyback pulses;

a capacitor;

impedance means;

said capacitor, said impedance means and said common cathode impedance being serially connected to form a series combination;

means for applying a unidirectional potential across said series combination so as to establish a circuit for charging said capacitor;

an electron discharge device having cathode, control grid and anode electrodes;

an input circuit coupled to the cathode and control grid electrodes of said electron discharge device;

means for applying flyback pulses from said source to said input circuit in such a manner as to render said electron discharge device periodically conducting during each flyback pulse occurrence and to bias said electron discharge device into a non-conducting state during the intervals between successive flyback pulse occurrences;

means including a coupling between said discharge device anode and said capacitor for establishing a discharging circuit for said capacitor, said capacitor discharging circuit including the series combination of said common cathode impedance, said capacitor and the cathode-anode discharge path of said discharge device, said capacitor discharging circuit being effectively disabled when said discharge device is biased to a non-conductind state and periodically enabled when said discharge device is rendered conducting, the time constant of said capacitor discharging circuit when enabled being of a first magnitude and the amplitude and direction of current flowing through said common cathode impedance when said discharging circuit is enabled being such as to promote the flow of grid current in each of said plurality of electron tubes;

said impedance means comprising a first anode resistor for said electron discharge device, and switching means for selectively shunting additional resistance across said first resistor.

References Cited by the Examiner

UNITED STATES PATENTS

| | | | |
|---|---|---|---|
| 3,062,914 | 11/1964 | Fernald et al. | 178—5.4 |
| 3,135,826 | 6/1964 | Moles et al. | 178—5.4 |

FOREIGN PATENTS

| | | |
|---|---|---|
| 218,371 | 4/1957 | Australia. |

DAVID G. REDINBAUGH, *Primary Examiner.*

J. A. O'BRIEN, *Assistant Examiner.*